United States Patent [19]

Tanaka

[11] Patent Number: 5,173,630
[45] Date of Patent: Dec. 22, 1992

[54] CONTROL DEVICE FOR ULTRASONIC MOTOR

[75] Inventor: Masayuki Tanaka, Nagaoka, Japan

[73] Assignee: Alps Electric Co., Ltd., Tokyo, Japan

[21] Appl. No.: 665,503

[22] Filed: Mar. 6, 1991

[30] Foreign Application Priority Data

Apr. 12, 1990 [JP] Japan .................................. 2-97057

[51] Int. Cl.⁵ .............................................. H01L 41/08
[52] U.S. Cl. .................................. 310/316; 318/116; 318/135; 310/323
[58] Field of Search ........................ 314/316, 317, 323; 318/116, 135

[56] References Cited

U.S. PATENT DOCUMENTS

| | | | |
|---|---|---|---|
| 4,857,791 | 8/1989 | Uchino et al. | 310/323 |
| 4,926,084 | 5/1990 | Furutsu et al. | 310/316 |
| 4,954,741 | 9/1990 | Furutsu et al. | 310/316 |
| 4,998,048 | 3/1991 | Furutsu et al. | 318/116 |
| 5,013,982 | 5/1991 | Sasaki | 318/116 X |

Primary Examiner—Mark O. Budd
Attorney, Agent, or Firm—Guy W. Shoup; Patrick T. Bever

[57] ABSTRACT

A control device for an ultrasonic motor which is suitable for use in controlling the speed of the ultrasonic motor includes an oscillator for generating drive signals of a resonant frequency of the ultrasonic motor; and a drive signal restricting device for turning on and off the drive signals at a fixed duty ratio. The control device further includes a counter in which counted results of the counter are incremented by a first pulse signal whose frequency increases as a target speed of the ultrasonic motor increases, and in which the counted results are decremented by a second pulse signal whose frequency increases as a travel speed of the ultrasonic motor increases; and a duty ratio setting device for causing the duty ratio to increase as the counted results of the counter increase.

1 Claim, 3 Drawing Sheets

CONTROL DEVICE FOR ULTRASONIC MOTOR

BACKGROUND OF THE INVENTION

1. Field of the Invention

The present invention relates to a control device for an ultrasonic motor which is suitable for use in controlling the speed of the ultrasonic motor.

2. DESCRIPTION OF THE RELATED ART

There has hitherto been a control device wherein when an ultrasonic motor is moved to a target position, the speed at which the ultrasonic motor travels is gradually slowed as it approaches the target position, whereby the ultrasonic motor is stopped accurately at the target position (refer to Japanese Unexamined Patent Application No. 1-325257). The travel speed of the ultrasonic motor is slowed in the following way. The position of the ultrasonic motor is detected by a position sensor or similar equipment. The duty ratio of a control pulse is gradually altered from 100% to 0% as the detected position approaches the target position; this control pulse being ANDed with a drive signal at a resonant frequency of the ultrasonic motor. The time during which the drive signal is fed is then interrupted incessantly.

In such a control device for an ultrasonic motor, the duty ratio of the control pulse is uniformly set with respect to the detected position of the ultrasonic motor. Therefore, when the speed of the motor varies due to factors such as fluctuations in load, it is difficult to correct the travel speed of the ultrasonic motor to an optimum value.

SUMMARY OF THE INVENTION

The present invention has been made in view of the above problem. The object of the invention is to provide a control device for an ultrasonic motor in which the travel speed of the ultrasonic motor can be automatically maintained at a target speed.

To solve the problem, the invention provides a control device for an ultrasonic motor comprising: an oscillator for generating drive signals of a resonant frequency of an ultrasonic motor; drive signal restricting means for turning on and off the drive signals at a fixed duty ratio; a counter in which counted results of the counter are incremented by a first pulse signal whose frequency increases as a target speed of the ultrasonic motor increases, and in which the counted results are decremented by a second pulse signal whose frequency increases as a travel speed of the ultrasonic motor increases; and duty ratio setting means for causing the duty ratio to increase as the counted results of the counter increase.

When the target speed of the ultrasonic motor is higher than the travel speed, the frequency of the first pulse signal becomes higher than that of the second pulse signal. As a result, the counted results of the counter are increased, so is the duty ratio, whereby the ultrasonic motor is accelerated.

On the other hand, when the target speed of the ultrasonic motor is lower than the travel speed, the frequency of the first pulse signal becomes lower than that of the second pulse signal. As a result, the counted results of the counter are decreased, so is the duty ratio, whereby the ultrasonic motor is decelerated.

The travel speed of the ultrasonic motor is therefore automatically controlled so as to be equal to the target speed.

DESCRIPTION OF THE PREFERRED EMBODIMENT

An embodiment of the present invention will be described below with reference to the drawings.

A highly energy-efficient ultrasonic linear motor (refer to Japanese Unexamined Patent Application No. 63-60714) which the inventor of this invention has previously proposed is utilized as an ultrasonic motor to be controlled.

Figure 2:
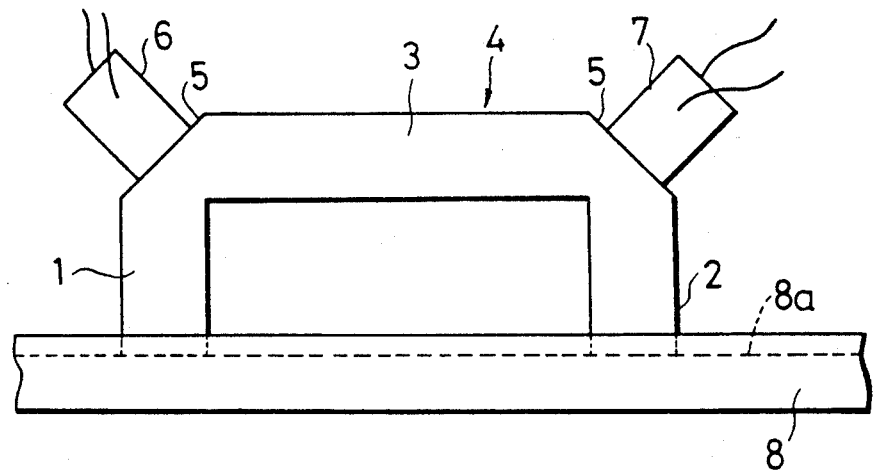
FIG. 2 is a schematic illustration showing the construction of an ultrasonic linear motor to be controlled.

First, the above ultrasonic linear motor will be briefly explained with reference to FIG. 2. In FIG. 2, numerals 1 and 2 each denote legs which are parallel to each other. Numeral 3 denotes a trunk connecting one end of each of these legs 1 and 2. These components 1, 2 and 3, whose cross sections are substantially square, are all made of an elastic material, thereby forming, as a whole, a reversed U-shaped vibrating body 4. The corners of the vibrating body 4 are chamfered off at an angle of 45° with respect to the legs 1, 2, and the trunk 3 so as to form attaching faces 5. Piezoelectric elements 6 and 7 are affixed to the attaching faces 5. A laminated piezoelectric actuator or single-plate piezoelectric ceramic is used as the piezoelectric elements 6 and 7, each of which extends in a direction perpendicular to each attaching face 5. The vibrating body 4 is positioned on a rail 8 so that the lower ends of the legs 1 and 2 come in contact with the rail 8. A groove 8a, into which the lower ends of the legs 1 and 2 are fit, is formed on the obverse surface of the rail 8. This groove 8a extends in the longitudinal direction of the rail 8.

To drive a thus-constructed ultrasonic linear motor, a drive signal, having a phase difference of 90°, is fed to the piezoelectric elements 6 and 7, this drive signal being fed at a resonant frequency which is a characteristic of the ultrasonic linear motor. The drive signal causes the lower ends of the legs 1 and 2 to move in an oval or a circle. The phase difference of this oval or circular movement is 90°. As a result, the legs 1 and 2 operate as if these legs 1 and 2 were kicking the rail 8, whereby the ultrasonic linear motor travels on the rail 8. If a drive signal for either the piezoelectric element 6 or 7 is regarded as signal A, and if the drive signal for the other piezoelectric element is regarded as signal B, then the direction in which the ultrasonic linear motor travels depends on whether the phase difference between signal A and signal B is +90° or −90°.

The control device in accordance with this embodiment controls an ultrasonic linear motor as described above, and is constructed as shown in FIG. 1.

Figure 1:
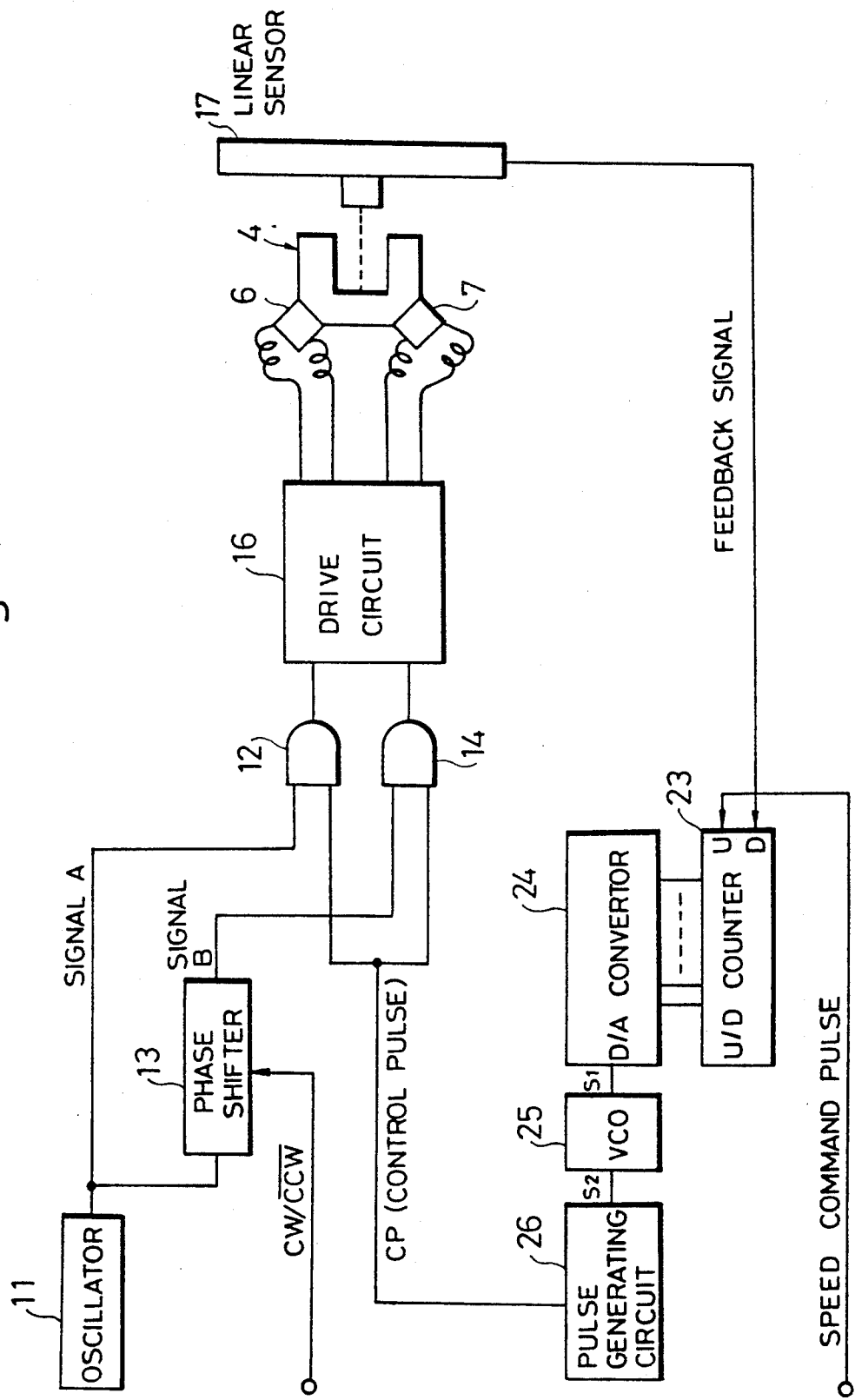
FIG. 1 is a block diagram showing the construction of an embodiment in accordance with the present invention.

In FIG. 1, numeral 11 designates an oscillator which oscillates at a resonant frequency which is a characteristic of the ultrasonic linear motor. The oscillator 11 outputs signal A as a drive signal. This signal A is fed to one input end of an AND circuit 12, and is also fed, through a phase shifter 13, to one input end of an AND circuit 14 in the form of signal B. The phase shifter 13 converts signal A into signal B, whose phase difference is $+90°$ or $-90°$ with respect to signal A. This conversion is based upon a direction command signal $CW/\overline{CCW}$ which is supplied from an external processing device (not shown) or the like. Thus, the direction command signal is raised to a high or low level, whereby the direction in which the ultrasonic linear motor travels can be reverted. A control pulse CP is input from a pulse generating circuit 26, (which will be described later in detail), to the other input ends of the respective AND circuits 12 and 14. Only when the control pulse CP is at the high level, will signals A and B be fed to a drive circuit 16 via the AND circuits 12 and 14, respectively.

The output ends of the respective AND circuits 12 and 14 are connected to the drive circuit 16. This drive circuit 16 drives the piezoelectric element 6 based on the output signal from the AND circuit 12, while on the other hand, it drives the piezoelectric element 7 based on the output signal from the AND circuit 14.

Numeral 17 indicates a linear sensor which outputs the amount of travel by the ultrasonic linear motor in the form of the number of pulses. These output pulses are fed to an input end D of an U/D counter (up/down counter) 23 as a feedback signal. The U/D counter 23 is constructed in such a manner that it is incremented by the pulse signal fed to an input end U thereof, and that the U/D counter 23 is decremented by the pulse signal supplied to the input end D, thereby outputting the counted results. In this embodiment, a speed command pulse is fed to the input end D from an external processing device (not shown) or the like. This speed command pulse contains the number of pulses which is equal to the number of pulses required for control over the travel of the ultrasonic linear motor.

Figure 5:
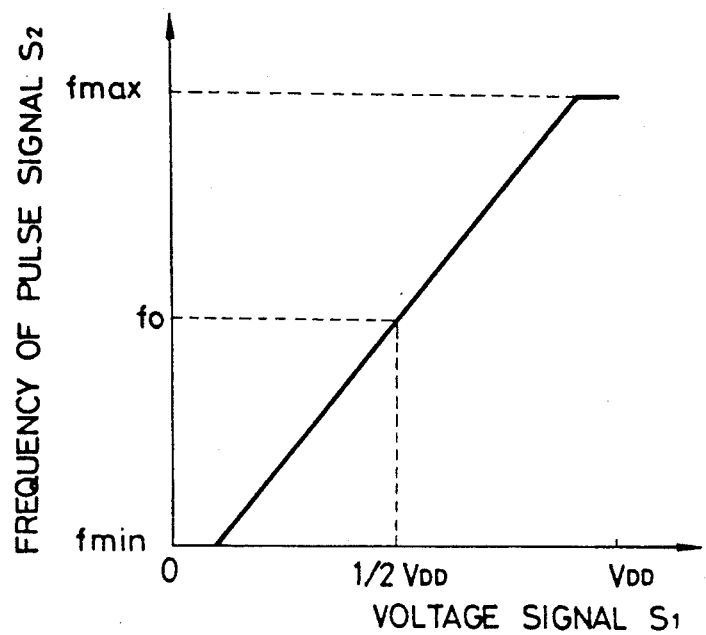
FIG. 5 is a view showing input and output characteristics of a VCO 25.

The counted results of the U/D counter 23 are converted into a voltage signal $S_1$ with the aid of a D/A convertor 24, and are then fed into a VCO (voltage control type oscillator) 25. The VCO 25 is so constructed that the higher the voltage signal $S_2$ is (that is, the higher the counted results of the U/D counter 23), the higher a frequency pulse signal $S_2$ will be. FIG. 5 shows the relationship between the voltage signal $S_1$ and the pulse signal $S_2$.

A pulse generating circuit 26 outputs a control pulse CP based on the pulse signal $S_1$. This operation will be explained in detail with reference to FIGS. 3 and 4.

Figure 3:
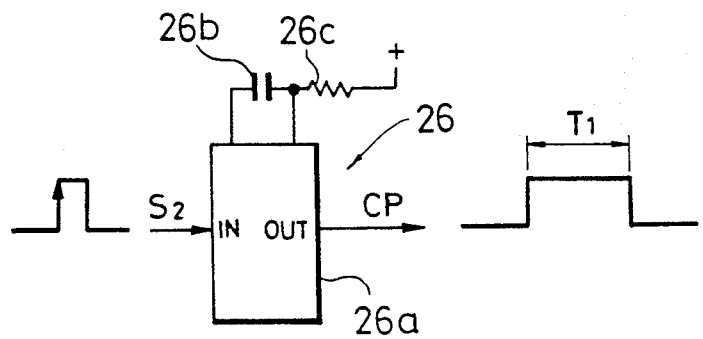
FIG. 3 is a circuit diagram of a pulse generating circuit 26.

FIG. 3 is the circuit diagram of the pulse generating circuit 26. This pulse generating circuit 26 is composed of a one-shot multivibrator 26a, a resistor 26c, and a capacitor 26b which determines the width of an output pulse sent from the one-shot multivibrator 26a. The one-shot multivibrator 26a, when supplied with the pulse signal $S_2$, outputs with the rise of the pulse signal $S_2$ a pulse signal having a pulse width $T_1$. The time constants of the capacitor 26b and the resistor 26c determine the pulse width $T_1$. This pulse signal is fed into the AND circuits 12 and 14 as a control pulse CP.

Figure 4:
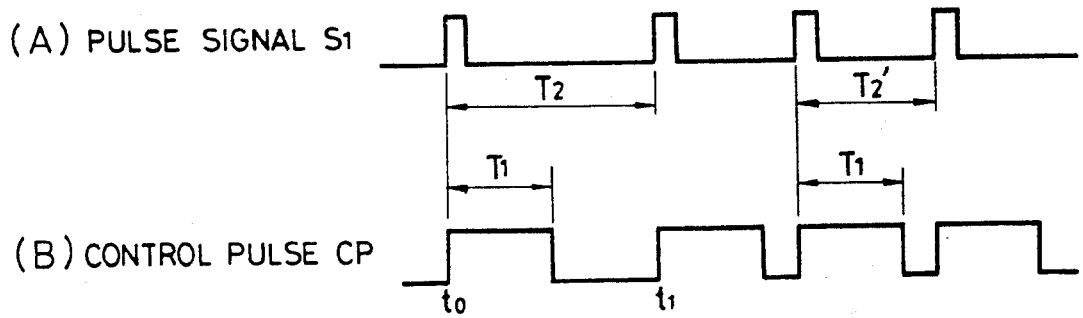
FIG. 4 is a view explaining the operation of the pulse generating circuit 26.

FIG. 4 (A) illustrates one example of the waveforms of the pulse signal $S_2$. In the example shown in FIG. 4 (A), a cycle before time $t_1$ of the pulse signal $S_2$ is indicated as $T_2$, whereas a cycle after time $t_1$ is indicated as $T_2'$ (where $T_2 > T_2'$). It is understood that a duty ratio $D'$ ($D' = T_1/T_2'$) after time $t_1$ is higher than a duty ratio $D$ ($D = T_1/T_2$) before time $t_1$.

Figure 6:
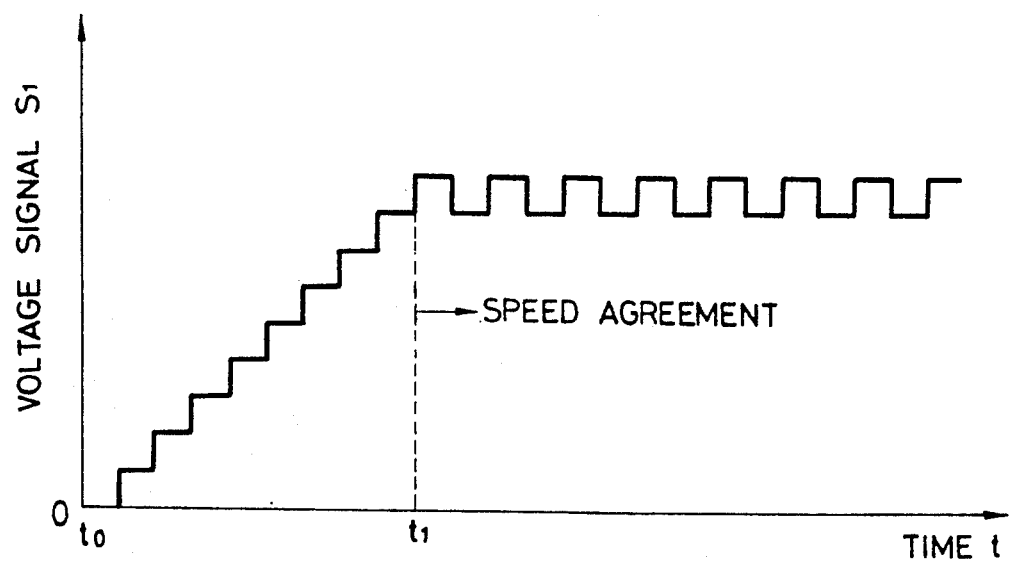
FIG. 6 is a view explaining the operation of an embodiment.

The operation of this embodiment will be described hereinafter with reference to FIG. 6.

The external processing device or the like sets a target value of the speed of the ultrasonic linear motor, and outputs the speed command pulse which has a frequency proportional to the target value. This speed command pulse is fed into the input end U of the U/D counter 23 after time $t_0$. It is conditioned that at time $t_0$ the counted results of the U/D counter 23 are reset to "0", and the ultrasonic motor is at rest. After time $t_0$, as the speed command pulse is input, the counted results of the U/D counter 23 are incremented. Thus, with the passage of time the voltage signal $S_1$ becomes higher, so does the frequency of the pulse signal $S_2$. The duty ratio of the control pulse CP which is output from the pulse generating circuit 26 also increases.

On the other hand, the drive signals, which are signals A and B, are supplied to the drive circuit 16 in accordance with the control pulse CP. The ultrasonic linear motor is thereby slowly accelerated and, as it travels, the feedback signal is output from the linear sensor 17.

Upon the input of the feedback signal into the input end D of the U/D counter 23, the counted results of the U/D counter 23 are decremented synchronously with this feedback signal. At this stage, when the speed at which the ultrasonic linear motor travels is lower than the target value, the frequency of the speed command pulse is higher than the frequency of the feedback signal As a result, the U/D counter is incremented, whereby the ultrasonic linear motor is further accelerated.

When the travel speed of the ultrasonic linear motor reaches the target value, the frequency of the speed command pulse and that of the feedback signal become the same. The counted results of the U/D counter 23 are thus maintained at a substantially constant value. The duty ratio of the control pulse CP is thereby substantially maintained at a constant value, whereby the ultrasonic linear motor is driven at a constant speed.

Furthermore, if, for some reasons, the frequency of the feedback signal assumes a higher value than that of the speed command pulse (i.e., if the travel speed of the ultrasonic linear motor becomes higher than a target speed of the ultrasonic linear motor), the counted results of the U/D counter 23 are decremented. The duty ratio of the control pulse CP is thereby reduced, and consequently the ultrasonic linear motor is decelerated.

It is thus understood from this embodiment that the travel speed of the ultrasonic linear motor is automatically controlled so as to be substantially equal to the target speed of the ultrasonic linear motor.

As has been described above, according to the control device for the ultrasonic motor of the present invention, the counted results of the counter are altered in accordance with the deviation of a travel speed of the ultrasonic linear motor from a target speed Since the duty ratio is thus set based on the counted results, the travel speed of the ultrasonic motor can be automatically maintained at the target speed.

What is claimed is:
1. A control device for an ultrasonic motor comprising:
    an oscillator for generating drive signals of a resonant frequency of an ultrasonic motor;

drive signal restricting means for turning on and off said drive signals at a fixed duty ratio;

a counter in which counted results of the counter are incremented by a first pulse signal whose frequency increases as a target speed of the ultrasonic motor increases, and in which the counted results are decremented by a second pulse signal whose frequency increases as a travel speed of said ultrasonic motor increases; and duty ratio setting means for causing said duty ratio to increase as the counted results of said counter increase.

* * * * *